United States Patent
Branham et al.

(10) Patent No.: US 7,980,049 B1
(45) Date of Patent: Jul. 19, 2011

(54) TWIN SHEET VACUUM FORMED COVERS FOR DISC MOWER CUTTERBARS

(75) Inventors: Douglas G. Branham, Chapin, SC (US); Nicole L. Fair, Lancaster, PA (US); Cecil R. Sudbrack, New Holland, PA (US); Robert L. Rice, New Holland, PA (US); Philip J. Ehrhart, Narvon, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/893,476

(22) Filed: Sep. 29, 2010

(51) Int. Cl.
*A01D 67/00* (2006.01)
(52) U.S. Cl. ..................................................... 56/320.1
(58) Field of Classification Search ............... 56/6, 7, 56/2, 320.1, 320.2, 16.7, 15.5, 17.5, 17.4, 56/11.1, 11.6, 13.6, 15.8, 15.9; 411/84, 85, 411/399, 539
See application file for complete search history.

(56) References Cited

U.S. PATENT DOCUMENTS

| | | | |
|---|---|---|---|
| 4,231,216 A | 11/1980 | Weber | |
| 4,452,033 A | 6/1984 | Scramuzza | |
| 4,887,420 A * | 12/1989 | Cerny et al. | 56/320.2 |
| 4,930,298 A | 6/1990 | Zenner | |
| 5,279,423 A | 1/1994 | Shuert | |
| 5,564,586 A | 10/1996 | Goodwin | |
| 5,809,757 A | 9/1998 | McLean et al. | |
| 5,884,466 A * | 3/1999 | Willmering et al. | 56/320.1 |
| 5,924,270 A | 7/1999 | Bruns | |
| 5,964,079 A | 10/1999 | Mellin et al. | |
| 6,189,307 B1 * | 2/2001 | Buss et al. | 56/320.1 |
| 6,440,353 B1 | 8/2002 | Hutchins | |
| 6,772,579 B2 * | 8/2004 | Osborne | 56/320.1 |
| 2003/0163981 A1 | 9/2003 | Osborne | |
| 2006/0248867 A1 | 11/2006 | Collard | |
| 2007/0120397 A1 | 5/2007 | Layfield et al. | |

* cited by examiner

*Primary Examiner* — Robert E Pezzuto
(74) *Attorney, Agent, or Firm* — Patrick M. Sheldrake; Michael G. Harms

(57) ABSTRACT

An improved shield panel for use in the top shield of a rotary disc cutterbar equipped mower that features a twin sheet, vacuum formed plastic panel with a steel frame that interfaces with existing hinge and mounting structures on the mower to enable the plastic shield panel to directly replace a steel shield panel. Stiffening ribs formed into the plastic shield provide the necessary strength for the shield panel while the resiliency of the plastic material enables the plastic shield panel to better withstand impacts from flying debris generated from cutterbar operation. Molded receptacles in the exterior surface of the shield panels are configured to receive connectors for the mower front shield curtain and any stiffening members necessary for attachment to the mower. The predominate use of plastic reduces weight and lowers production costs compared to a comparable steel panel with a plastic protective liner.

16 Claims, 4 Drawing Sheets

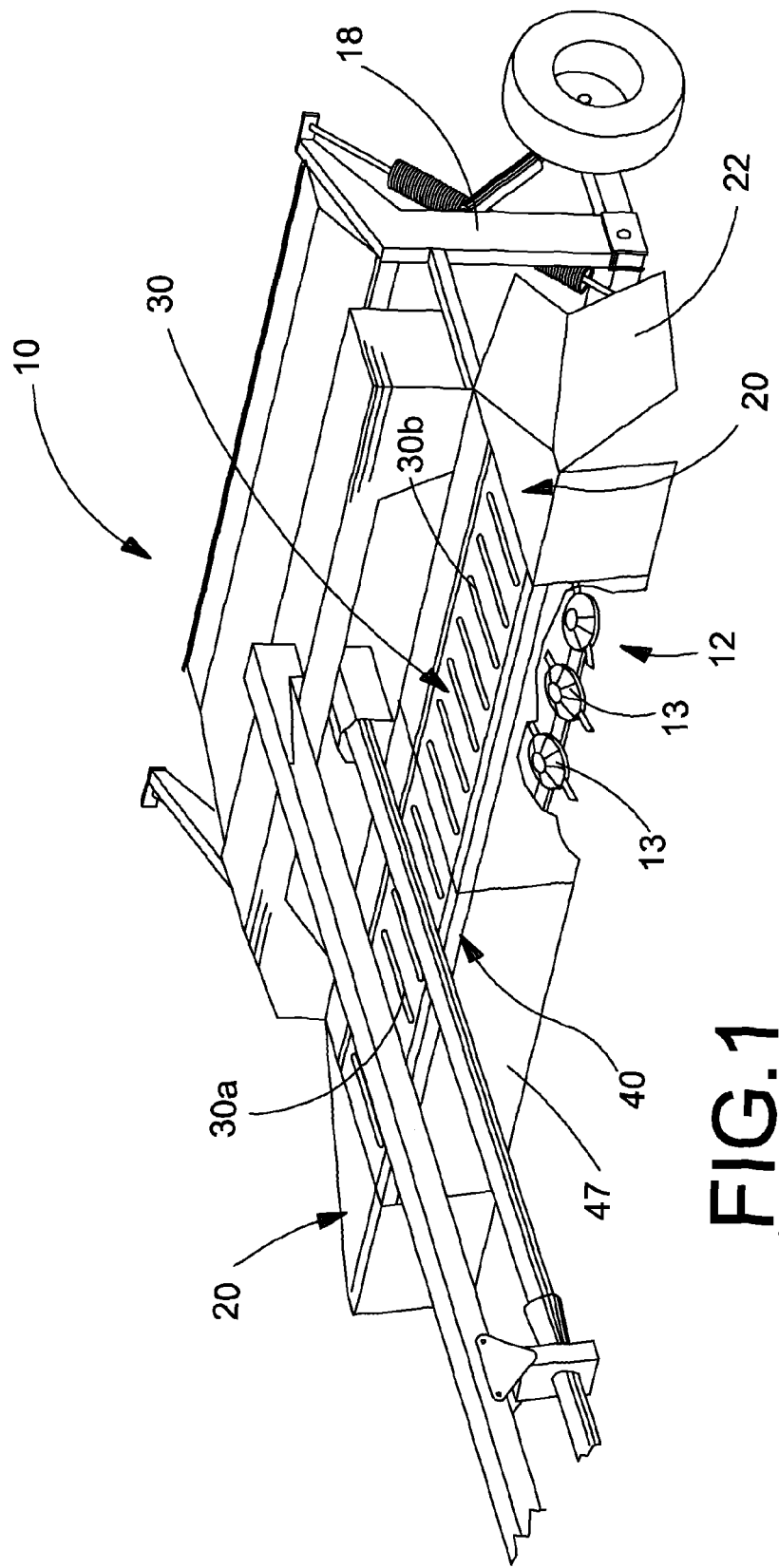

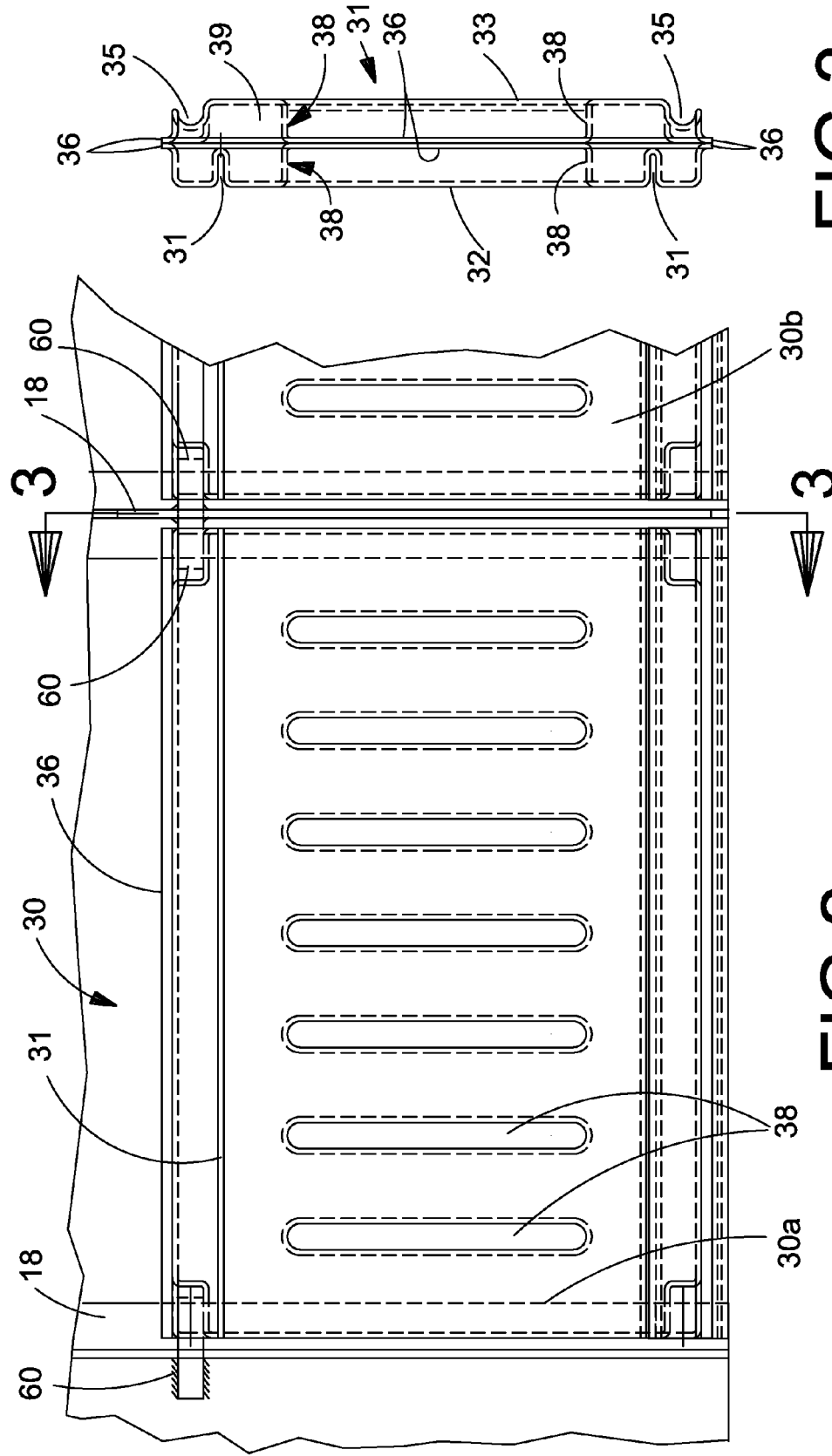

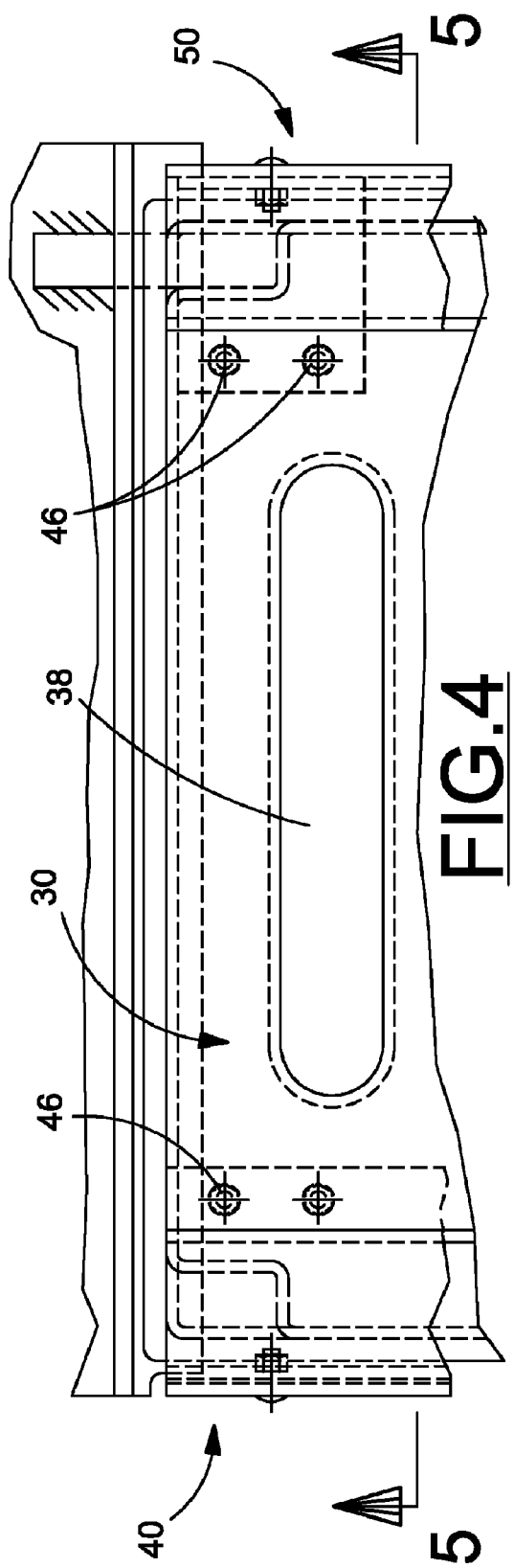
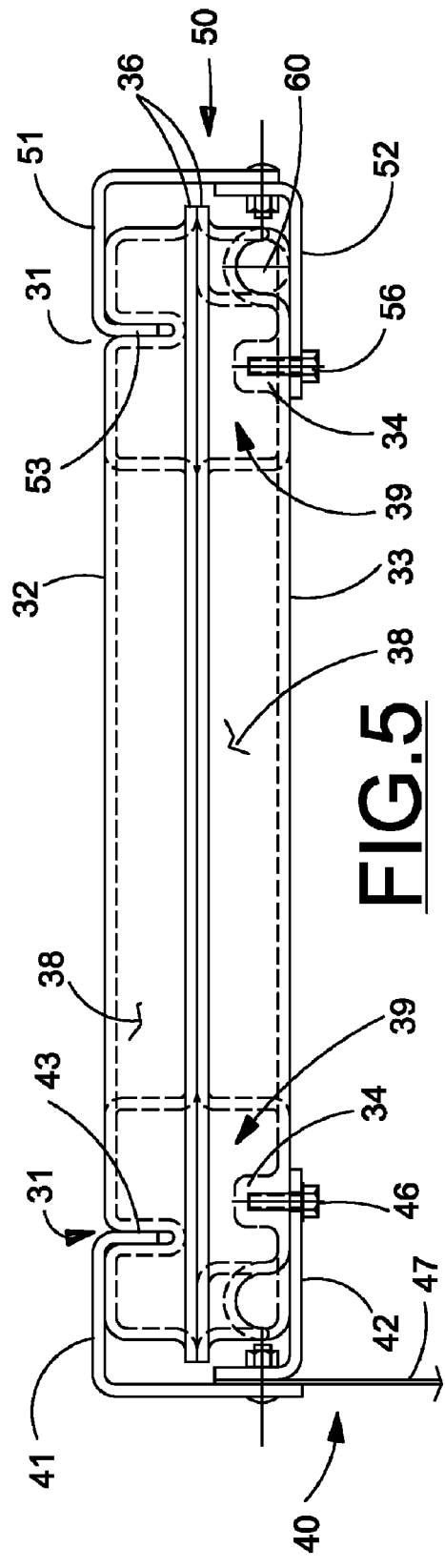

US 7,980,049 B1

TWIN SHEET VACUUM FORMED COVERS FOR DISC MOWER CUTTERBARS

BACKGROUND OF THE INVENTION

This invention relates generally to a machine for severing standing crops from the ground to initiate a harvesting process and, more particularly, to an improved cover lid for machines having rotary disc cutterbars.

Typical agricultural mowers using rotary disc cutterbars feature cover shields above, alongside, and forward of the disc cutterbar to contain and manage the flow of the severed crop material. These shields also serve to contain projectiles (e.g., stones) launched through interaction with the cutterbar within the confines of the machine thus reducing the risk of injury to persons or machines near to the mower during operation. Most of the shields are formed from steel to provide a rugged and durable shield capable of withstanding continuous impacts from flying debris. One notable exception is the forward shield, which is typically formed from heavy rubber so that it will flex as the mower moves over the standing crop just prior to the severing action of the cutterbar.

The shields are removably connected to the mower to allow access to the cutting area for maintenance and repair. Some shields feature hinged connections to the mower chassis to allow easy access to the mower interior and cutterbar area. The interior surface of the metal shields is often provided with a sacrificial plastic liner sheet to protect the steel shield from debris impact and further enhance the durability of the shields. This approach results in shield panels that are heavy which increases production costs both in terms of the shields and the hardware connecting the shields to the mower.

It would be advantageous to provide a lighter, more economical alternative mower shield panel that could provide similar durability to the steel shields. Further advantages would be realized by a mower shield panel that could be formed from plastic thereby significantly decreasing the panel weight and production cost. Still further advantages would be realized by a molded plastic shield panel that could directly replace the steel shield panels on production mowers.

SUMMARY OF THE INVENTION

Accordingly, the present invention, in any of the embodiments described herein, may provide one or more of the following advantages:

It is an object of the present invention to provide a replacement shield panel for a disc cutterbar equipped mower cutterhead formed predominately from plastic.

It is a further object of the present invention to provide a plastic shield panel for a disc cutterbar equipped mower that is formed by a twin sheet vacuum molding process that provides similar durability as the steel shield panel it replaces.

It is a further object of the present invention to provide a replacement top shield for a rotary disc cutterbar-equipped mower that is easily raised to provide access to the cutterbar area of the mower.

It is a further object of the present invention to provide a plastic replacement top shield for a rotary disc cutterbar-equipped mower that is capable of supporting the front curtain shield.

It is a still further object of the present invention to provide a replacement top shield for a mower that weighs less that the steel shield it replaces.

It is a still further object of the present invention to provide a twin sheet vacuum formed plastic top shield for a disc cutterbar equipped agricultural mower that is durable in construction, inexpensive of manufacture, carefree of maintenance, easily assembled, and simple and effective to use.

These and other objects are achieved in accordance with the instant invention by providing a twin sheet, vacuum formed plastic shield panel for use in the top shield of a rotary disc cutterbar equipped mower that interfaces with existing hinge and mounting structures on the mower to enable the plastic shield panel to directly replace a steel shield panel. Stiffening ribs formed into the plastic shield provide the necessary strength for the shield panel while the resiliency of the plastic material enables the plastic shield panel to better withstand impacts from flying debris generated from cutterbar operation. Molded receptacles in the exterior surface of the shield panels are configured to receive connectors for the mower front shield curtain and any stiffening members necessary for attachment to the mower. The predominate use of plastic reduces weight and lowers production costs compared to a comparable steel panel with a plastic protective liner.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a perspective view of an agricultural mower of the type on which the present invention is useful;

FIG. 2 is a partial plan view of the a top shield used on an agricultural mower embodying the present invention;

FIG. 3 is an end view of the top shield panel shown in FIG. 2 taken along cut line 3-3;

FIG. 4 is a detail plan view of a portion of the top shield panel shown in FIG. 2 detailing the connection to the mower frame;

FIG. 5 is an end view of the top shield panel shown in FIG. 2 taken along cut line 5-5.

DESCRIPTION OF THE PREFERRED EMBODIMENT(S)

Figure 6:
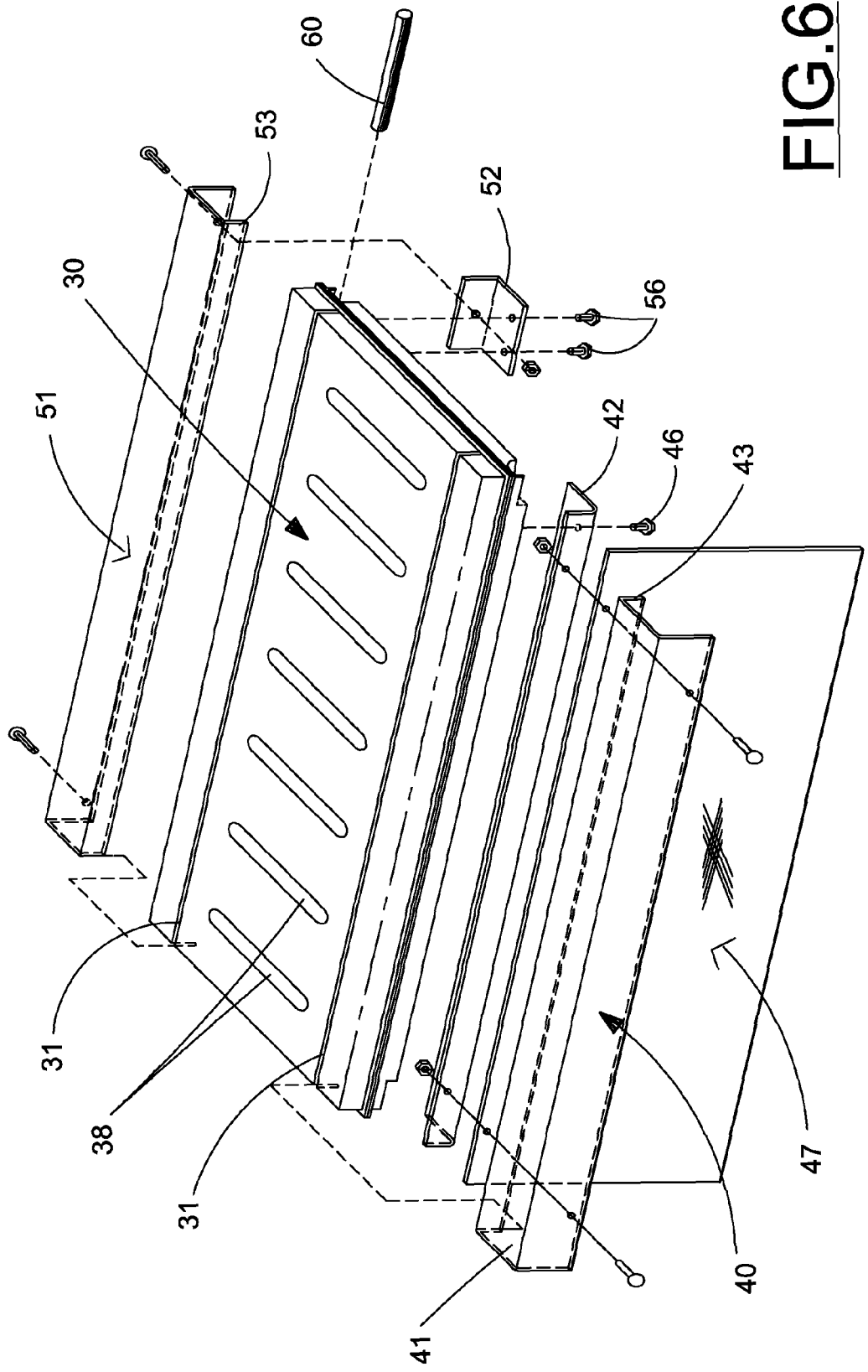
FIG. 6 is an exploded assembly view of one embodiment of the top panel of the present invention.

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Referring now to the drawings and particularly to FIG. 1, an agricultural mower 10 featuring a rotary disc cutterbar 12 of the type on which the present invention finds utility is presented. Such agricultural mowers are well-known in the art and configured for forward movement through a field of standing crop to sever the crop from the ground for subsequent harvesting operations. Mowers may be pulled behind a tractor, such as the one shown in FIG. 1, or attached to and supported by a dedicated tractor in what is commonly referred to as a self-propelled harvester. Disc cutterbars 12 have been utilized in agricultural harvesting implements for many years. Each disc cutterbar includes a plurality of transversely spaced disc cutter modules 13 driven for rotation about a generally vertical axis. Each disc cutter module 13 has two or three knives pivotally mounted on the periphery thereof to sever standing crop from the ground through an impact action. For background information on the structure and operation of disc cutterbars, reference is made to U.S. Pat. No. 4,815,262, issued to Koch et al. and to U.S. Pat. No. 5,996,323, issued to Campbell et al., the descriptive portions thereof being incorporated herein by reference.

The mower 10 also features shields 20 supported by the mower chassis 18 which generally surround the cutterbar in order to contain the severed crop material and any other airborne debris within the confines of the mower. Shields 20 specifically include side shields 22, a top shield 30 and a front shield 47. The front shield 47 is typically formed from a flexible material, such as rubber, to allow standing crop to enter the cutterbar area. The top shield 30 traditionally includes a hinge connection to the mower chassis 18 enabling the top shield 30 to be raised so that the cutterbar area may be accessed. Top shield 30 may also comprise one or more individual panels 30a, 30b to maintain the individual panel weights reasonably low so that raising the panels may be easily performed by hand.

Now referring to FIGS. 2 through 6, several views of one shield panel 30a of top shield 30 and front shield 47 are shown in detail. Shield panel 30 comprises a first side 32 and a second side 33 arranged with such that their outer surfaces generally parallel and spaced apart from each other. The first and second sides 32, 33 are connected at their peripheral edges 36 to form a generally rectangular panel when viewed in plan. The separation of the first and second sides creates a hollow volume 39 within. The preferred method of forming the top shield panel 30a, 30b is vacuum forming wherein two sheets of thermo-setting plastic are molded into opposing dies to define surface contours of each sheet, respectively, and the two sheets are joined together at their peripheral edges to create a hollow interior volume between the two sheets.

Top shield panels 30 are connected to the mower chassis 18 by a top shield frame 50 comprising a pair of frame extensions 51, 52 that together form an elongate channel into which one edge 36 of a top shield panel 30 may be received. Frame extensions 51, 52 may be integrally formed into a single top shield frame 50 or may be fastened together from multiple pieces as shown in the figures. The first frame extension 51 is typically disposed adjacent to the first side 32 of the shield panel while the second frame extension 52 is disposed adjacent to the second side 33 of the panel. Each frame extension 51, 52 includes a retainer structure 53, 56 to engage the panel 30 and retain it in a fixed position relative to the top shield frame 50.

Shield panels 30 include one or more receptacles 31, 34 configured to be engaged by retainers 53, 56 on frame members to enable the plastic molded panel 30a, 30b to be conveniently connected to the mower chassis 18. First receptacle 31 is disposed adjacent one of the peripheral edges 36 forming the rectangular boundary of the panel 31 and is configured as an inset groove extending into the panel interior volume. The first frame extension 53 is configured to be received into the receptacle 31. The groove configuration of receptacle 31 provides restrain in a direction perpendicular to the axis of the groove. Closing the ends of the first receptacle groove 31 could engage ends of the retainer 53 to limit movement in the direction of the groove. In the embodiment shown, the second retainer 56 is a fastener that engages a second receptacle 34, which may include a threaded insert molded into the second side 33, that provides restraint in two directions and is thus better suited for providing lateral (in a direction parallel with first receptacle groove 31) restraint of the panel.

The shield panels 30 are hingedly connected to the mower chassis by one or more axles 60. Axles 60 are preferably fixed to mower chassis 18 and aligned generally transversely. The axles 60 are received in axle recesses 35 molded into the shield panels 30 and captured by second frame extension 52. The configuration of the axle recesses 35 allows the panels 30 to pivot about the axles 60; the axle recesses 35 are sufficiently deep to accept the entire diameter of the axle 60 such that the second frame extension 52 does not frictionally engage the axle 60 when assembled.

The top shield panels 30 are also required to provide support for the forward shield 47. As installed on a mover, the forward frame will be connected to a peripheral edge opposite to the connection of the top shield frame 50. To this end, a forward frame 40 is provided to connect to the shield panels 30 in a manner similar to the connection between the panels and top shield frame 50. Forward frame thus includes first and second extensions 41, 42 defining a channel into which a peripheral edge 36 of the panel 30 may be received. The panel 30 also includes additional first and second receptacles 31, 34 adjacent to the forward edge of the panel 30 opposite form the top shield frame connection location. First and second retainers 43, 46, similar to those used for the top shield frame connection are used in a common connection approach. This common approach allows the shield panels to be symmetrically molded from front to rear for greater assembly ease and flexibility. Forward shield 47 is connected to the forward frame 40 and suspended above the ground, forward from the cutterbar to intercept the trajectory of flying debris moving forwardly from the cutterbar.

The shield panel 30 may be further strengthened by stiffening ribs 38 molded into each sheet. Stiffening ribs 38, preferably in the form of elongate indentations in the shield sides extending inwardly into the volume 39, may be formed on one or both sides of the panel and may extend partially into the interior volume 39 or a distance sufficient to make contact with the interior surface of the opposing side. The size and number of stiffening ribs 38 can be varied to establish the overall panel stiffness required. In this way, the top shields 30 of the present invention, though preferably formed of molded plastic, can functionally replace a steel top shield saving cost and machine weight.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A top cover for a shroud assembly on an agricultural mower, the mower having a transversely oriented cutterbar, said top cover comprising:

a transverse frame hingedly connected to the mower generally above the cutterbar, said frame having a first extension and a second extension arranged to define a transversely extending channel therebetween, said first and second extensions each having a retainer; and a shield panel having generally opposing first and second sides bounded by a generally rectangular perimeter edge, said first and second sides connected to one another adjacent to said perimeter edge in a manner enclosing a generally hollow volume therein, said first and second sides each having a receptacle configured to receive said first and second retainers, respectively, such that said shield panel is fixedly engaged with said frame adjacent to a first portion of said perimeter edge by engagement of said retainers with said receptacles.

2. The top cover of claim 1, wherein said shield panel is made from a vacuum formed plastic.

3. The top cover of claim 2, wherein said frame is made from metal.

4. The top cover of claim 2, wherein said top cover further comprises a plurality of stiffening ribs molded into at least one of said sides, each of said plurality of stiffening ribs having an inner portion protruding into said hollow volume.

5. The top cover of claim 4, wherein said inner portion of one side contacts said second side.

6. The top cover of claim 3, wherein said first retainer is a tab angled relative to said first extension and said first receptacle is a groove in said first side configured to receive said tab.

7. The top cover of claim 6, wherein said second retainer is a threaded fastener and said second receptacle is a threaded connector molded into said top cover.

8. The top cover of claim 2, further comprising a skirt retainer connected to said shield panel adjacent to a second portion of said perimeter edge opposite from said first portion, said skirt retainer being connected to said shield panel as said transverse frame is connected to said shield panel.

9. In an agricultural mower configured for forward movement across the ground through a standing crop, the mower having a transversely oriented cutterbar for severing the standing crop from the ground, and a shroud partially surrounding the cutterbar to contain the severed crop material therein, the improvement in the shroud comprising:

a transverse frame having a first extension and a second extension arranged to define a transversely extending channel therebetween, said first and second extensions each having a retainer; and a shield panel having generally opposing first and second sides bounded by a generally rectangular perimeter edge, said first and second sides connected to one another adjacent to said perimeter edge in a manner enclosing a generally hollow volume therein, said first and second sides each having a receptacle configured to receive said first and second retainers, respectively, such that said shield panel is fixedly engaged with said frame adjacent to a first portion of said perimeter edge by engagement of said retainers with said receptacles and whereby said shield panel is positioned generally above the cutterbar and hingedly connected to the mower.

10. The improvement of claim 9, wherein said shield panel is made from a vacuum formed plastic.

11. The improvement of claim 10, wherein said frame is made from metal.

12. The improvement of claim 10, wherein said top cover further comprises a plurality of stiffening ribs molded into at least one of said sides, each of said plurality of stiffening ribs having an inner portion protruding into said hollow volume.

13. The improvement of claim 12, wherein said inner portion of one side contacts said second side.

14. The improvement of claim 11, wherein said first retainer is a tab angled relative to said first extension and said first receptacle is a groove in said first side configured to receive said tab.

15. The improvement of claim 14, wherein said second retainer is a threaded fastener and said second receptacle is a threaded connector molded into said top cover.

16. The improvement of claim 11, further comprising a skirt retainer connected to said shield panel adjacent to a second portion of said perimeter edge opposite from said first portion, said skirt retainer being connected to said shield panel as said transverse frame is connected to said shield panel.

\* \* \* \* \*